United States Patent [19]

Hunter

[11] Patent Number: 5,054,925
[45] Date of Patent: Oct. 8, 1991

[54] METHOD FOR ALIGNING AN INTERFEROMETER

[75] Inventor: George C. Hunter, Middletown, Conn.

[73] Assignee: Zygo Corporation, Middlefield, Conn.

[21] Appl. No.: 637,930

[22] Filed: Jan. 8, 1991

Related U.S. Application Data

[63] Continuation of Ser. No. 294,479, Jan. 6, 1989, abandoned.

[51] Int. Cl.$^5$ ............................................... G01B 9/02
[52] U.S. Cl. .................................... 356/363; 356/153; 356/360
[58] Field of Search ............... 356/358, 359, 360, 363, 356/153

[56] References Cited

U.S. PATENT DOCUMENTS 4,201,473 5/1980 Domenicali et al. ................ 356/360
4,772,123 9/1988 Radnea ................................ 356/153

Primary Examiner—Samuel Turner
Attorney, Agent, or Firm—Bryan, Cave, McPheeters & McRoberts

[57] ABSTRACT

In an interferometer alignment system comprising an interferometer having a plurality of movable elements (78) alignable with respect to an optical axis, a source of radiant energy (1) for the interferometer, means (9, 13) for providing a measurement wavefront (10 M) and a reference wavefront (10 R) from the radiant energy (1), and means (5, 14) for collecting the measurement and reference wavefronts and focusing them as spots (15 R, 15 M); the improvement comprising a camera (18) having a photosensitive surface (29); means (17) for imaging the focused spots (15 R, 15 M) onto the photosensitive surface (29) of the camera (18), the camera (18) providing an output signal (19, 20, 21) based on the imaged spots (15 R, 15 M); means for providing the output signal (19) to a video type monitor (25) for enabling a display (24) of the imaged spots on the monitor (25); means for processing (22) the output signal (21) for providing a set of corresponding coordinates for the displayed imaged spots (30 R, 30 M); means for defining a camera pixel corresponding to the interferometer optical axis (27); means for providing a display of the corresponding coordinates relative to the defined camera pixel (27) on the monitor (25); means responsive to the provided corresponding coordinates for providing a control signal (26) proportional to the coordinates; and means responsive to the control signal (26) for enabling movement of the elements until the coordinates correspond to the defined camera pixel.

34 Claims, 2 Drawing Sheets

METHOD FOR ALIGNING AN INTERFEROMETER

This application is a continuation of application Ser. No. 07/294,279, filed Jan. 6, 1989; and now abandoned.

BACKGROUND OF INVENTION

1. Field of the Invention

The present invention relates to interferometric measurement apparatus. More particularly, the invention relates to a method for aligning an interferometer.

2. The Prior Art

An interferometer is a basic instrument for optical metrology. The measurement accuracy of an interferometer depends on the accuracy of the alignment of the measurement and reference wavefronts to the optical axis. One prior art alignment method, described in my U.S. Patent, entitled "Optical Interferometer System with CCTV Camera for Measuring a Wide Range of Aperture Sizes", U.S. Pat. No. 4,201,473, issued May 6, 1980, is based on moving the television type images of two spots produced by the reference and measurement wavefronts, to the center of a television type image of an alignment reticle.

Prior art alignment methods may have some limitations, such as the operation of the alignment method being manual in nature and requiring an operator, or the method being subjective, depending on the operator's skill and judgment.

The present invention retains the basic viewing of the television type image of two alignment spots on a video monitor, however, the means used in the instant invention does not require the display of an alignment reticle and produces digital coordinates allowing automatic, objective alignment of the interferometer elements.

SUMMARY OF INVENTION

In accordance with the instant invention, I provide a means for aligning an interferometer comprising; (1) means for collecting the measurement and reference wavefronts and focusing them as spots; (2) means for imaging said spots onto the photosensitive surface of a camera; (3) means for displaying said spots on a video monitor; (4) means for processing the output of said camera to generate the two dimensional coordinates of said spots; (5) means for identifying the camera pixel which coincides with the optical axis of said interferometer; (6) means for displaying on said video monitor the coordinates of said spots relative to said camera pixel which coincides with the optical axis of said interferometer; (7) means to output electrical signals proportional to said coordinates of said spots; (8) means to align the elements of said interferometer such that said spots coincide with said camera pixel which coincides with the optical axis.

THE DRAWINGS

DETAILED DESCRIPTION OF THE INVENTION

Figure 1:
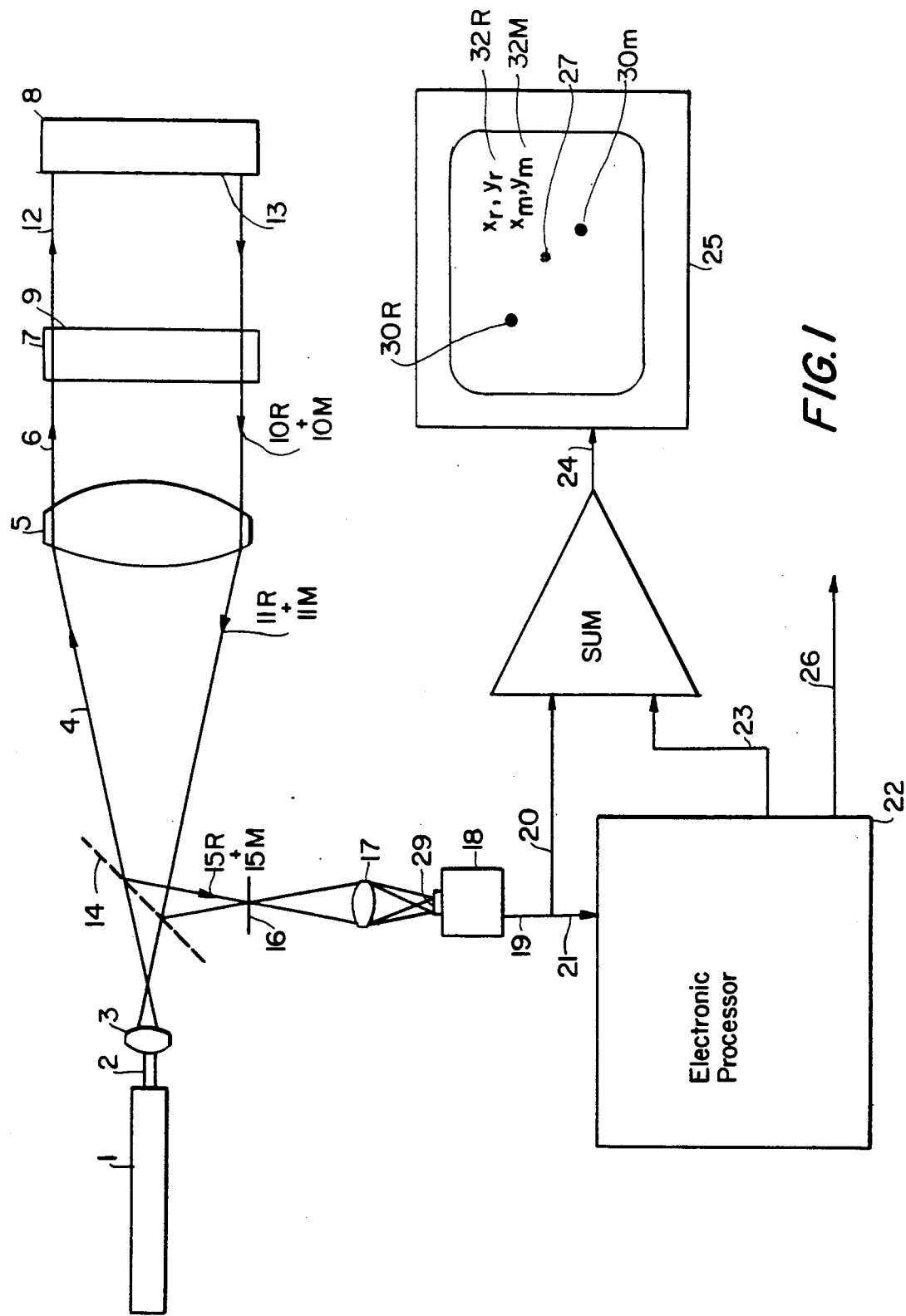
FIG. 1 depicts in schematic form one embodiment of the instant invention.

Description and explanation of FIG. 1.

FIG. 1 is a schematic diagram of the instant invention.

While the apparatus has application for a wide range of radiation sources, the following description is taken by way of example with respect to an optical measuring system. The term "radiant energy" as used herein includes, but is not limited to, electromagnetic energy of all frequency ranges.

A light source such as a tungsten bulb, xenon bulb, light-emitting diode, laser diode or other source of radian energy, and most preferably a gas laser (1), provides optical energy for the narrow, nearly collimated beam (2). The beam diverger (3) converts beam (2) to a diverging spherical wavefront (4) which collimating lens (5) converts to a plano wavefront (6). Optical elements (7) and (8), which comprise an interferometer cavity, are placed in the plano wavefront (6). FIG. 1 depicts a plano Fizeau-type interferometer; however, the apparatus of the instant invention is not limited to this type of interferometer. The apparatus of the instant invention is useful with a great variety of well known interferometer types, e.g. two beam and multiple beam Fizeau, plano and spherical type Fizeau and Twyman-Green, and Mach-Zehnder interferometers.

In FIG. 1, the plano wavefront (6) impinges on the partially reflective transmission element (7) which has a partially reflective, flat reference surface (9). The wavefront (10R) is the portion of wavefront (6) which is reflected by the reference surface (9). Wavefront (10R), hereafter denoted the reference wavefront, is collected by lens (5) to form the converging spherical reference wavefront (11R). The portion (12) of wavefront (6) which is transmitted by the reference surface (9) is denoted the measurement wavefront. If surface (13) of element (8) is the entity under test, then the portion of measurement wavefront (12) reflected by surface (13) and transmitted by element (7) is the plano wavefront (10M) which is denoted the measurement wavefront after interaction with the article under test. This too is collected by lens (5) to form the converging measurement wavefront (11M). Portions of wavefronts (11R) and (11M) are reflected by beamsplitter (14) to produce wavefronts (15R) and (15M). A diffuse screen (16) is placed at the focus of wavefronts (15R) and (15M). In some cases diffuse screen (16) may not be needed, such as placing the camera (18) photo sensitive surface (29) at the focus of wavefronts (15R) and (15M). Lens (17) images the spots formed by the focused wavefronts (15R) and (15M) onto the photo sensitive surface of the camera (18). Camera (18) may be a vidicon, or solid-state array camera CID, CCD, MOS or any other type. The camera (18) outputs a video signal (19) which is divided into two signals (20) and (21). Signal (21) is processed by the electronic processor (22) generating a graphical display signal (23) of the two dimensional coordinates of the spots formed by the focused wavefronts (15R) and (15M) relative to the camera pixel which coincides with the optical axis of said interferometer (27). Signal (20) is added to signal (23) to form a superimposed video signal (24). Video signal (24) is then displayed on a video monitor (25.) Further the electronic processor (22) outputs signal (26) which is proportional to the two dimensional coordinates of the spots formed by the focused wavefronts (15R) and (15M) relative to the camera pixel which coincides with the optical axis of said interferometer (27).

The pixel which coincides with the optical axis of said interferometer (27) is preferably identified using the method disclosed in my, U.S. Pat. No. 3,844,660 issued Oct. 20, 1974. After being so identified, its position coordinates are stored in the microcomputer memory of the electronic processor. Other less desirable methods of alignment can be used without departing from the spirit and scope of the present invention, since this measurement is a one-time operation.

An element of the interferometer cavity is aligned with respect to the interferometer system, i.e., with respect to wavefront (6), by directly reading the relative position (32R), (32M) of the spot (30R), (30M) from the interferometer optical axis on the video monitor and moving the spot until it is coincident with the optical axis. For example, to align the reference surface (9) of element (7), (30R) is moved until (32R) indicates the spot is coincident with the optical axis. Coincidence can be indicated by (32R), (32M) displaying cartesian coordinates or other coordinate systems, other graphical techniques can be used such as bar charts or radial lines from the central pixel. The motion of the spots is affected either by tilting a plano interferometer surface or by transverse translations of a spherical interferometer surface.

Following the aforementioned procedure, the second element of the interferometer cavity can be aligned similarly.

Figure 2:
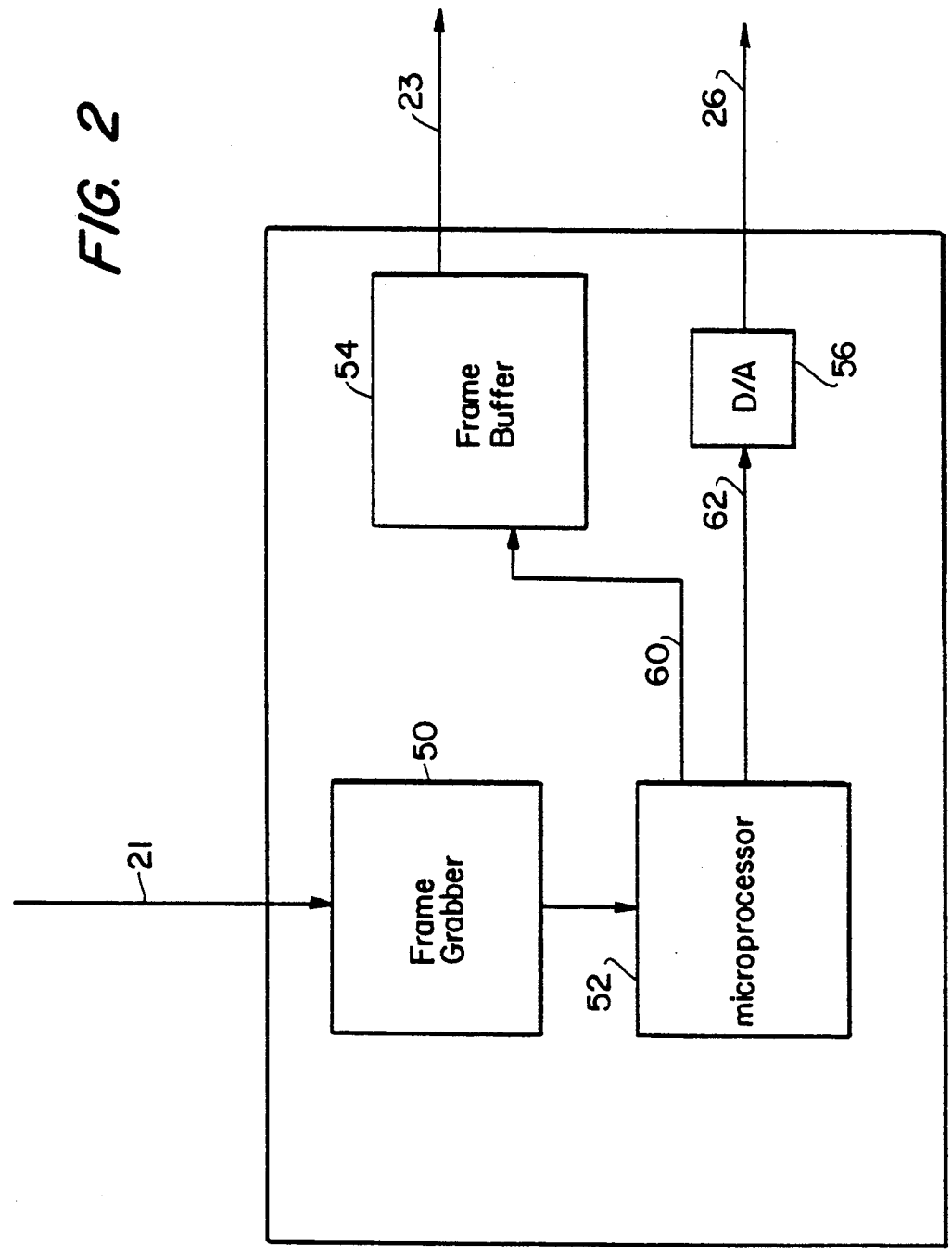
FIG. 2 depicts in schematic form further detail of one embodiment of the Electronic Processor of the instant invention.

Description and Explanation of the Schematic in FIG. 2.

FIG. 2 depicts in schematic form further detail of one embodiment of the Electronic Processor (22) of the instant invention.

The camera outputs video signal (21). Signal (21) is input into frame grabber (50). The frame grabber (50), which can be any of a number of commercially available frame grabbers, conventionally stores the video information in computer memory to be processed by the micro-processor (52). The micro-processor (52) is conventionally programmed to identify the coordinates of the center of the spots focused on the photo sensitive surface (29) of the camera (18). The micro-processor (52) outputs a digital signal (60) containing a graphical representation of the coordinates of the center of the spots. Frame buffer (54) converts the digital signal into an appropriate video signal, such as an RS-170 signal, and outputs signal (23). The micro-processor (52) also outputs a digital signal (62) proportional to the coordinates of the center of the spots. Signal (62) is converted to an analog signal in digital-to-analog converter (56) and output as signal (26). Signal (26) can then be utilized for automatic alignment using conventional motors, piezo-electric translators, or other electrical-motion transducers to move the appropriate interferometer elements to effect the alignment of one or more of these interferometer elements.

What is claimed:

1. In an interferometer alignment system comprising an interferometer having a plurality of movable elements alignable with respect to an optical axis, a source of radiant energy for said interferometer, means for providing a measurement wavefront and a reference wavefront from said radiant energy, and means for collecting said measurement and reference wavefronts and focusing them as spots; the improvement comprising a camera having a photosensitive surface; means for imaging said focused spots onto said photosensitive surface of said camera, said camera providing an output signal based on said imaged spots; means for providing said output signal to a video type monitor for enabling a display of said imaged spots on said monitor; means for processing said output signal for providing a set of corresponding coordinates for said displayed imaged spots; means for predetermining a camera pixel location corresponding to a predetermined location of said interferometer optical axis; means for providing a display of said corresponding coordinate relative with respect to said predetermined location of said optical axis corresponding to said predetermined camera pixel location on said monitor; means responsive to said provided corresponding coordinate for providing a control signal proportional to said coordinates; and means responsive to said control signal for enabling movement of said elements until said coordinates correspond to said predetermined camera pixel location; whereby the location of said optical axis is predetermined prior to the alignment of said elements.

2. An improved interferometer alignment system in accordance with claim 1 wherein said source or radiant energy comprises a laser.

3. An improved interferometer alignment system in accordance with claim 1 wherein said source of radiant energy comprises a coherent light source.

4. An improved interferometer alignment system in accordance with claim 1 wherein said source of radiant energy comprises a tungsten bulb.

5. An improved interferometer alignment system in accordance with claim 1 wherein said source of radiant energy comprises a xenon bulb.

6. An improved interferometer alignment system in accordance with claim 1 wherein said source of radiant energy comprises a light emitting diode.

7. An improved interferometer alignment system in accordance with claim 1 wherein said source of radiant energy comprises a collimated beam.

8. An improved interferometer alignment system in accordance with claim 1 wherein said interferometer comprises a plano Fizeau type interferometer.

9. An improved interferometer alignment system in accordance with claim 1 wherein said interferometer comprises a spherical Fizeau type interferometer.

10. An improved interferometer alignment system in accordance with claim 1 wherein said interferometer comprises a Twyman-Green type interferometer.

11. An improved interferometer alignment system in accordance with claim 1 wherein said interferometer comprises a Mach-Zehnder type interferometer.

12. An improved interferometer alignment system in accordance with claim 1 wherein said interferometer comprises a two beam Fizeau type interferometer.

13. An improved interferometer alignment system in accordance with claim 1 wherein said interferometer comprises a multiple beam Fizeau type interferometer.

14. An improved interferometer alignment system in accordance with claim 1 wherein said camera photosensitive surface is disposed at the focus of said reference and measurement wavefronts.

15. An improved interferometer alignment system in accordance with claim 1 wherein said means for imaging said focused spot comprises a diffuse screen onto which said collected wavefronts are focused to form said focused spots.

16. An improved interferometer alignment system in accordance with claim 15 wherein said means for imaging said focused spots further comprises lens means for imaging said focused spots on said diffuse screen onto said photosensitive surface.

17. An improved interferometer alignment system in accordance with claim 16 wherein said camera comprises a solid state array camera.

18. An improved interferometer alignment system in accordance with claim 15 wherein said camera comprises a solid state array camera.

19. An improved interferometer alignment system in accordance with claim 1 wherein said camera comprises a solid state array camera.

20. An improved interferometer alignment system in accordance with claim 16 wherein said camera comprises a vidicon.

21. An improved interferometer alignment system in accordance with claim 15 wherein said camera comprises a vidicon.

22. An improved interferometer alignment system in accordance with claim 1 wherein said camera comprises a vidicon.

23. An improved interferometer alignment system in accordance with claim 1 wherein said means for processing said output signal comprises an electronic processor for generating a graphical display signal of the two dimensional coordinates of said focused spots relative to said predetermined camera pixel location.

24. An improved interferometer alignment system in accordance with claim 23 wherein said camera output signal comprises a video signal, said display providing means comprising means for adding said graphical display signal to said video signal for providing a superimposed video signal to said video type monitor for providing a display thereof on said monitor.

25. An improved interferometer alignment system in accordance with claim 24 wherein said electronic processor further comprises said control signal providing means.

26. An improved interferometer alignment system in accordance with claim 24 wherein said camera comprises a solid state array camera.

27. An improved interferometer alignment system in accordance with claim 23 wherein said camera comprises a solid state array camera.

28. An improved interferometer alignment system in accordance with claim 24 wherein said camera comprises a vidicon.

29. An improved interferometer alignment system in accordance with claim 23 wherein said camera comprises a vidicon.

30. An improved interferometer alignment system in accordance with claim 1 wherein said means for predetermining said camera pixel location further comprises means for storing a set of coordinates corresponding to the position of said predetermined camera pixel location.

31. An improved interferometer alignment system in accordance with claim 30 wherein said means for processing said output signal comprises an electronic processor for generating a graphical display signal of the two dimensional coordinates of aid focused spots relative to said predetermined camera pixel location.

32. An improved interferometer alignment system in accordance with claim 31 wherein said coordinates are cartesian coordinates.

33. An improved interferometer alignment system in accordance with claim 30 wherein said coordinates are cartesian coordinates.

34. An improved interferometer alignment system in accordance with claim 1 wherein said coordinates are cartesian coordinates.

* * * * *